Oct. 19, 1948.　　　J. A. HIPPLE, JR　　　2,451,950
ELECTRICAL NETWORK
Filed April 27, 1944

WITNESSES:

INVENTOR
John A. Hipple, Jr.
BY
F. W. Lyle
ATTORNEY

Patented Oct. 19, 1948

2,451,950

UNITED STATES PATENT OFFICE 2,451,950

ELECTRICAL NETWORK

John A. Hipple, Jr., Verona, Pa., assignor to Westinghouse Electric Corporation, East Pittsburgh, Pa., a corporation of Pennsylvania Application April 27, 1944, Serial No. 533,093

5 Claims. (Cl. 250—27)

My invention relates to electrical networks, and in particular comprises an electrical network adapted to produce a quantity which varies in accordance with the logarithm of another quantity. These quantities may in a particular instance be electrical voltages or currents and in such cases the one may be of amplified magnitude in comparison with the other.

For certain types of electric measurement, it is desirable to obtain an electric current which varies in proportion to the logarithm of another electric current. This is particularly true in the case of measuring instruments which must record wide variations of an electrical current or voltage, and must have scales which indicate the quantities with something like the same percentage precision when they are small that it does when they are large; in short where the instrument must have an expanded scale in recording the lower values of the quantities and a contracted scale in recording their higher values. Instruments employing so-called logarithmic charts are examples of such devices.

It is accordingly, one object of my invention to provide an electrical network having an output current which has a substantially accurate logarithmic relation to an input current.

Another object of my invention is to provide an electrical network in which an output current of substantial magnitude bears an exponential relationship to an input current.

It is still another object of my invention to provide an arrangement in which the mechanical displacements of a recording arm bear an exponential relationship to the magnitude of an input current.

It is still another object of my invention to produce an arrangement in which the mechanical displacements of one member are proportional to the logarithm of the mechanical displacements of another member.

It is a still further object of my invention to provide an arrangement in which movements of a recording member are adapted to accurately record on logarithmic charts the values of a control quantity.

Still another object of my invention is to provide an electrical network in which the output voltage is proportional to the exponential of the input voltage.

It is still another object of my invention to provide an electrical network in which the output voltage is proportional to the logarithm of an input voltage.

Figure 1:
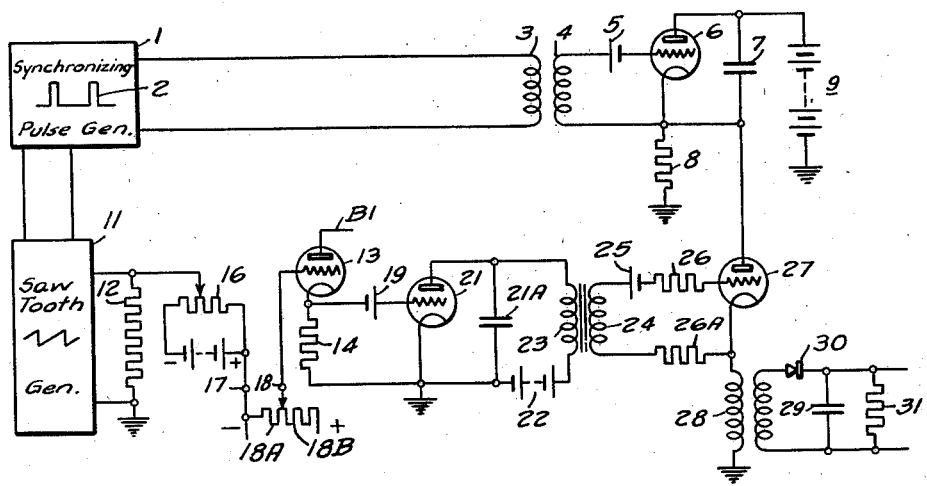
Figure 2:
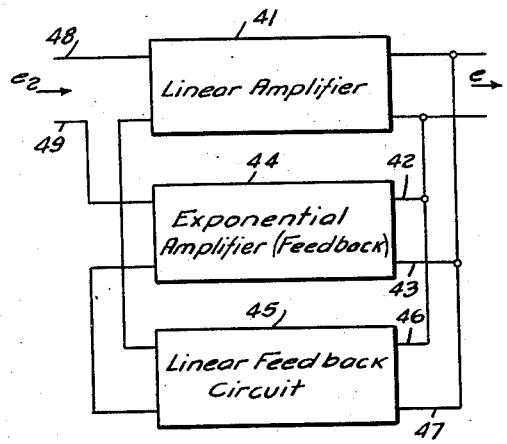

Other objects of my invention will become apparent upon reading the following description taken in connection with the drawings, in which:

Figure 1 is a schematic diagram of an electrical network embodying the principles of my invention to produce an output voltage proportional to the exponential of the input voltage; and Fig. 2 is a schematic diagram of an arrangement in which the output voltage is proportional to the logarithm of the input voltage.

Referring in detail to the drawing, an electrical generator 1, which may be of the electron tube type well-known in the art, produces electrical pulses of short duration compared with the time interval separating them, these pulses and the intervals separating them may, for example, be represented by the wave form 2 shown within the confines of the rectangle 1 in the drawing. Electrical generators of this type are well known in the art and require no detailed description here. The output wave of the form just described is impressed on a primary winding 3 having a secondary winding 4 connected through a suitable bias battery 5 to impress voltage on the control electrode of an electron tube 6 which is preferably of the gaseous discharge type well known in the electronics art. Between the anode and the cathode of the tube 6 are connected a capacitor 7 and in parallel therewith a resistor 8 and a constant voltage source 9.

The output of the pulse generator 1 is likewise connected to control the output of a saw-tooth wave generator 11 of a type too well known in the electronics art to require detailed description, the saw-tooth generator producing discharges having the same period as the voltage pulses of the pulse generator 1, and the steep portion of the saw-tooth wave being synchronized in time with the aforesaid pulses. The output of the saw-tooth generator 11 is shunted through a suitable resistor 12 having one end grounded. The saw-tooth generator 11 should be so poled as to make its ungrounded end positive when at the positive maximum of the wave. An electron tube 13 which is preferably of the high vacuum type has its anode connected to the positive terminal of a suitable source B1 of unidirectional voltage, the negative terminal of said source being connected to the cathode of tube 13 through an output resistor 14. Between the control electrode and the ungrounded end of the resistor 12 are serially connected a variable source 16 of bias potential and a pair of terminals 17—18 for the electrical quantity which is to be recorded. The voltage to be impressed across terminals 17, 18 which might be the output of a direct-current amplifier should have its negative terminal adjacent bias source 16 and its positive terminal adjacent the grid of tube 13. As one example of the latter, this quantity may be the voltage drop picked off from a potentiometer 18A by a movable contact 18B which is mechanically displaced in proportion to a current or other quantity to be measured. For example, the movable contact may be carried by the recording arm of a recording ammeter or voltmeter of standard type commonly sold on the open market.

The terminals of the cathode resistor 14 are connected through a suitable bias battery 19 between the control electrode and the cathode of a gaseous discharge electrical discharge tube 21 which may, for example, be a thyratron tube of a type commonly sold on the open market. The anode and cathode of the discharge tube 21 shunted by a capacitor 21A are connected in series with a suitable voltage source 22 through the primary winding 23 of a transformer, of which the secondary winding 24 is connected through a suitable bias battery 25 and two equal resistors 26 and 26A to impress a voltage between the control electrode and cathode of an electron tube 27 which is preferably of the high vacuum type. The anode of the tube 27 is connected to the cathode of the tube 6 while its cathode is connected through a primary winding 28 to the negative terminal of the voltage source 9. A capacitor 29 is connected through a rectifier 30 to a secondary winding cooperating with winding 28 and is shunted by a resistor 31.

The mode of operation of the network just described will now be explained. The value of the bias battery 5 is adjusted so that in the interval between pulses of the pulse generator 1, the tube 6 is nonconductive. The value of the bias battery 25 is likewise adjusted so that when no voltage is impressed by the secondary winding 24, the electron tube 27 is non-conductive. Under such circumstances, the capacitor 7 will be charged through the resistor 8 to substantially the voltage of the source 9. When thereafter the pulse generator 1 impresses a voltage pulse on the control grid of the tube 6 through the transformer windings 3 and 4, the capacitor 7 will quickly discharge through the tube 6, then extinguish tube 6 and begin to recharge from source 9 through resistor 8. The voltage $e$ across the terminals of the resistor 8 will then vary exponentially with the time so that it will be represented by the equation (1) $$e = E \epsilon^{-\frac{t}{RC}}$$

where E is the voltage of source 9, R the resistance of resistor 8, C is the distributed capacitance of the charging circuit of capacitor 7 and $t$ the time during which charging proceeds, and $\epsilon$ the base of natural logarithms. At the same time that the voltage pulse from generator 1 starts the discharge of the capacitor 7 it initiates a saw-tooth wave of the generator 11 and the voltage of the latter will increase at a uniform rate with time. The value of the bias source 16 is so adjusted that with the minimum voltage which is to be measured impressed across the terminals 17—18, the current flowing through resistor 14 from tube 13 is just sufficient when the saw-tooth voltage of generator 11 reaches its peak to cause the gaseous discharge tube 21 to conduct substantial current. Under this condition an entire period of the saw-tooth wave elapses between the initiation of charging of capacitor 7 and the energizing of tube 27. In other words, the voltage drop $e$ across winding 28 is represented by Equation 1 if $t$ therein is taken equal to the period of pulse generator 1.

If now the voltage impressed on the terminals 17—18 is made larger, the voltage drop across the resistor 14 will reach the critical value capable of causing a discharge to start in the tube 21 at an earlier point in the cycle of the saw-tooth generator 11 and will produce a pulse of voltage rendering the tube 27 conductive similarly at an earlier time in the cycle of the saw-tooth generator 11. In fact the relationship between the voltage $e_1$ impressed on terminals 17, 18 and the time $t$ in the cycle of the saw-tooth wave is expressed by the equation (2) $$e_1 = K(t_0 - t)$$

where $t_0$ is the length in time of the saw-tooth wave; i. e. $t_0$ is the periodic time of pulse generator 1.

The time elapsing between the generation of the pulse in generator 1 and the impression of a positive voltage pulse on the control electrode of tube 27 is the time represented by $t$ in Equation 1.

When the positive pulse is impressed on the tube 27, it becomes conductive and impresses across the winding 28 a voltage (3) $$e = E \epsilon^{-\frac{t}{RC}}$$

Therefore, the voltage which will be suddenly impressed upon the winding 28 will be proportional to the exponential of the time. We can however by substituting the value of $t$ from Equation 2 in Equation 3 express $e$ in terms of $e_1$ thus (4) $$e = E\epsilon^{-\frac{t}{RC}} = E\epsilon^{\frac{e_1}{KRC}} \epsilon^{-\frac{t_0}{RC}} = \left(E\epsilon^{-\frac{t_0}{RC}}\right) \epsilon^{\frac{e_1}{KRC}} = E' \epsilon^{ae_1}$$

The tube 27 remains conductive only for the short duration of the pulse impressed on its control electrode by the secondary winding 24, so that only a pulse of current flows through winding 28. During that pulse, the capacitor 29 charges substantially through rectifier 30 to a voltage equal to the potential drop across winding 28; but it is able to feed a current substantially proportional to this voltage to which it is charged through a load circuit such as resistor 31 to which it is connected in shunt. Such a load circuit may, for example, comprise the recording element of a recording voltmeter or might be the input circuit of a power amplifier. The deflections of this recording element, being proportional to the average value during the period between successive pulses of the generator 1 of the exponential voltage across winding 28, are like the latter represented by Equation 4. The recording element is, accordingly, adapted to record varying values of the voltage across input terminals 17—18 on a chart having an exponential current or voltage scale.

Equation 4 may be transposed to read (5) $$e_1 = \frac{1}{a} \log_\epsilon \frac{e}{E'}$$

While, the voltage $e_1$ impressed across the terminals 17—18 is thus seen to be proportional to the logarithm of the voltage $e$ impressed across resistor 31, it will be noted that the voltage $e_1$ across terminals 17—18 is the input voltage of the network while that across resistor 31 is the output voltage. We have thus an arrangement in which the input voltage is proportional to the logarithm of the output voltage; but for many purposes it is desirable to obtain an electrical network in which it is the output voltage which is proportional to the logarithm of the input voltage. An arrangement which caused a voltage across the terminals 17—18 to automatically vary until the voltage across the resistor 31 was equal to a voltage impressed on a pair of input terminals would clearly effect the above-mentioned desired result. This may be accomplished either mechanically or electrically by recorders now marketed; for example by the Leeds & Northrop "Speedowax" or "Microwax." In Fig. 2 I show a circuit arrangement in which the network shown in Fig. 1 may be embodied to produce this desired result.

Referring to Fig. 2, 41 is an ordinary amplifier in which the output voltage is linearly proportional to the input voltage; that is to say, it is equal to A times the input voltage. In multiple with the output terminals of the amplifier 41 are connected the input terminals 42—43 of an exponential amplifier of the type shown in Fig. 1; that is to say the terminals 42—43 of exponential amplifier 44 correspond to the input terminals 17—18 in Fig. 1. A linear feedback circuit which may be a second amplifier in which the output voltage is proportional to B times the input voltage has its input terminals 46—47 likewise connected in multiple with the output terms of the amplifier 41. The amplifiers 44 and 45 are connected to the input terminals 48—49 of the system in such a way that amplifier 44 opposes the input voltage $e_2$ in acting on the input of the linear amplifier 41 while amplifier 41 assists it.

Disregarding for the moment the voltage impressed on the input circuit of linear amplifier 45, the net voltage impressed on the input terminals of amplifier 41 is equal to the input voltage $e_2$ on terminals 48—49 minus the output voltage $e_3$ of the exponential amplifier 44. Since the output voltage $e_4$ of amplifier 41 is impressed on terminals 42—43 of the exponential amplifier 44, the value of $e_3$ the output voltage of the latter is shown by Equation 4 to be $e_3 = E' \epsilon^{ae_4}$. Since the output voltage $e_4$ of the amplifier 41 is A times its input voltage, the following equation may be written:

(6) $\quad e_4 = A(e_2 - e_3) \equiv A(e_2 - E' \epsilon^{ae_4})$

By merely transposing, Equation 6 may be rewritten to read:

(7) $\quad E' \epsilon^{ae_4} = e_2 - \dfrac{e_4}{A}$

If the quantity A is large enough compared with $e_2$ this equation becomes (8) $\quad \epsilon^{ae_4} = \dfrac{e_2}{E'}$ and by taking the logarithm of each side this in turn becomes:

(9) $\quad e_4 = \dfrac{1}{a} \log_\epsilon \dfrac{e_2}{E'}$

It is thus evident that by making the quantity A, i. e., the amplification of amplifier 41 large enough an arrangement comprising simply the linear amplifier 41 with the exponential amplifier 44 arranged as a feedback circuit for the latter will produce an output voltage $e_4$ which is approximately proportional to the logarithm of the input voltage $e_2$, except at very small values of the latter.

However, the employment of the feedback circuit 45 in Fig. 2 makes it possible to avoid even the discrepancy involved in this approximation and to make the output voltage $e_4$ exactly equal to the logarithm of the input voltage to the terminals 48—49.

When we add a term to the Equation 6 to take care of the circuit 45, we obtain the following:

(10) $\quad e_4 = A(e_2 - E' \epsilon^{ae_4} + Be_4)$ or

(11) $\quad \left(\dfrac{1}{A} - B\right) e_4 + E' \epsilon^{ae_4} = e_2$

It is obvious that if the quantity $$\left(\dfrac{1}{A} - B\right)$$

equals zero Equation 11 changes to:

(12) $\quad E' \epsilon^{ae_4} = e_2$

Equation 9 may be transposed to read

(13) $\quad e_4 = \dfrac{1}{a} \log_\epsilon \dfrac{e_2}{E'}$ showing that we have a network in which the output voltage is strictly proportional to the logarithm of the input voltage to terminals 48—49.

To obtain an output voltage strictly proportional to the logarithm of the input voltage the relationship $$\left(\dfrac{1}{A} - B\right) = 0$$

should exist; i. e., the gain of amplifier 45 should thus be inversely proportional to that of amplifier 41.

The arrangement described in Fig. 1 has been shown to produce an output voltage across resistor 31 which is related to the input voltage across terminals 17, 18 by Equation 4 which involves an exponential $\epsilon^{ae_1}$ having a positive exponent. However, by a comparatively simple change, it is possible to alter the system into one in which the voltage across resistor 31 will be an exponential having a negative exponent. This alteration consists merely in reversing the polarity of the potential applied to the terminals 17, 18. When this is done, we have, instead of Equation 2, the relationship

(14) $\quad e_1 = kt$

Substitution of this relationship in Equation 3 gives

(15) $\quad e = E_\epsilon^{-\dfrac{e_1}{KRC}}$

Under such circumstances, it will be noted that when the voltage impressed upon terminals 17—18 is of a comparatively small value, the time during which capacitor 7 has charged before its voltage is impressed across output winding 28 is short, and the charging current flowing through resistor 8 is comparatively large, giving a relatively wide-scale deflection to a recording element connected across capacitor 29. On the other hand, if the voltage impressed across terminals 17—18 is large, the time during which capacitor 7 has been charging before tube 27 becomes conductive will be large and the charging current through resistor 28 will be correspondingly small, giving rise to a substantially decreased scale of deflection to the recording element connected across resistor 31. The scale of deflection of the recording element across capacitor 29 thus decreases as the voltage impressed across terminals 17—18 increases, and does so in accordance with an exponential relationship.

If the amplifier 44 in Fig. 2 is arranged to give an output which is an exponential with a negative exponent, Equation 6 becomes

(16) $\quad e_4 = A\left(e_2 - E_\epsilon^{-\dfrac{e_1}{KRC}}\right)$ and, in consequence, Equations 9 and 13 become, respectively,

(17) $\quad e_4 = -KRC \log_\epsilon \dfrac{e_2}{E} \equiv KRC \log_\epsilon \dfrac{E}{e_2}$

(18) $\quad e_4 = -KRC \log_\epsilon \dfrac{e_2}{E} \equiv KRC \log_\epsilon \dfrac{E}{e_2}$ Thus, the Fig. 2 arrangement has been transformed into one in which the voltage $e_4$ across the output terminals is proportional to the logarithm of the inverse of the input voltage.

It will be noted that the logarithmic relationship of the apparatus above described is dependent only upon the correlated action of a constant voltage source 9, an ohmic resistance 8 and a capacitor 7 and does not depend upon such quantities as the characteristic curves of electron tubes. The elements 9, 8 and 7 are all elements which can be readily made to have constant and invariable operating characteristics little affected by either ageing, operating or environment temperatures. As a result, the above described arrangement has been found to produce and maintain a constant logarithmic relationship between its input and output voltages. For example, I have operated such an arrangement as appears in Fig. 1 to record currents varying over a range of 1000 to 1 and found the constants of the logarithmic recording scale to vary by less than .2 of a percent over a half hour period.

While I have described a particular embodiment of my invention to comply with the requirements of the patent statutes, other embodiments and uses of that principle exist and will be self-evident to those skilled in the art.

I claim as my invention:

1. An electrical network comprising a source of constant voltage, a resistor and a capacitor connected in series with each other, means for short-circuiting said capacitor for a short period of time, means for energizing an output circuit in accordance with the current flow through said resistor at a predetermined time interval subsequent to the short-circuiting of said capacitor, and means for varying said time interval in accordance with the sum of an input voltage and a saw-tooth voltage which has its minimum coincident with the short-circuiting of said capacitor.

2. The method of producing an output voltage having a logarithmic relation to an input voltage which comprises producing a current which varies with the exponential of time and producing a current flow in an output circuit which is proportional to the value of said current after a time interval which is proportional to the value of said input voltage.

3. An electrical network comprising a source of constant voltage, a resistor and a capacitor connected in series with each other, a first electrical discharge tube connected in shunt to said capacitor, means for generating periodic voltage pulses having a duration small compared with their periodic time, means for causing said voltage pulses to render said discharge device periodically conductive, a second electrical discharge tube having an anode, a control electrode and a cathode connected in shunt to said resistor, a saw-tooth generator having the minima of its output voltage synchronized with said pulses and having its output voltage connected in series with an input voltage to the control electrode of a third electrical discharge tube which is connected to a current-supply means, means for causing voltage pulses to be impressed upon the control electrode of said second electrical discharge tube in response to the attainment of a predetermined value by current through said third electrical discharge tube and an output circuit energized by current flow through said second discharge tube.

4. An electrical network having input terminals and output terminals and comprising a source of constant voltage, a resistor and a capacitor connected in series with each other, a first gaseous discharge tube shunting said capacitor and having a control electrode, a second electrical discharge tube having an anode, a control electrode and a cathode connected in series with said output terminals across said resistor, means for generating voltage pulses having a duration short compared with their periodic time, means for impressing said voltage pulses on the control electrode of said first electrical discharge tube, a generator of saw-tooth voltage synchronized with said voltage pulses and having its output terminals in series with said input terminals across the control circuit of a third electrical discharge tube which is connected to a current-supply means, means for impressing a voltage proportional to the current flow through said third electrical discharge tube upon the control electrode of a fourth electrical discharge tube which has a gaseous atmosphere and is connected to a current supply, and means for impressing voltage pulses generated by said fourth electrical discharge tube on the input electrode of said second electrical discharge tube.

5. An electrical network having input terminals and output terminals and comprising a source of constant voltage, a resistor and a capacitor connected in series with each other, a first gaseous discharge tube having a control electrode shunting said capacitor, a second electrical discharge tube having an anode, a control electrode and a cathode connected in series with said output terminals across said resistor, means for generating voltage pulses having a duration short compared with their periodic time, means for impressing said voltage pulses on the control electrode of said first electrical discharge tube, a generator of saw-tooth voltage synchronized with said voltage pulses and having its output terminals in series with said input terminals, a third electrical discharge tube having an anode, a control electrode and a cathode with a cathode resistor and is connected to a current supply and having the voltage output of said saw-tooth generator and said input voltage connected between its control electrode and the terminal of said cathode resistor which is remote from its cathode, means for impressing the voltage drop of said cathode resistor between the control electrode and cathode of a fourth electrical discharge tube, said fourth electrical discharge tube containing a gaseous atmosphere and having a cathode and an anode supplied with current and cooperating with said control electrode, and means for impressing a voltage proportional to the rate of change of current flow between the cathode and anode of said fourth discharge tube between the control electrode and cathode of said second electrical discharge tube.

JOHN A. HIPPLE, Jr.

REFERENCES CITED

The following references are of record in the file of this patent:

UNITED STATES PATENTS

| Number | Name | Date |
| --- | --- | --- |
| 1,752,228 | Brillouin | Mar. 25, 1930 |
| 1,887,237 | Finch | Nov. 8, 1932 |
| 2,162,874 | Wurmser | June 20, 1939 |
| 2,269,001 | Blumlein | Jan. 6, 1942 |
| 2,313,666 | Peterson | Mar. 9, 1943 |